(12) United States Patent  (10) Patent No.: US 9,068,901 B1
Pauly  (45) Date of Patent: Jun. 30, 2015

(54) MULTI-PHASE POWER AMPLIFIER

(71) Applicant: DYNAMIC SOLUTIONS LLC, Northridge, CA (US)

(72) Inventor: R. Wayne Pauly, Islamorada, FL (US)

(73) Assignee: DYNAMIC SOLUTIONS LLC, Northridge, CA (US)

( * ) Notice: Subject to any disclaimer, the term of this patent is extended or adjusted under 35 U.S.C. 154(b) by 331 days.

(21) Appl. No.: 13/766,516

(22) Filed: Feb. 13, 2013

Related U.S. Application Data

(60) Provisional application No. 61/638,359, filed on Apr. 25, 2012.

(51) Int. Cl.
*G01M 7/02* (2006.01)
*H02M 7/493* (2007.01)
*H02P 25/02* (2006.01)

(52) U.S. Cl.
CPC ............... *G01M 7/02* (2013.01); *H02M 7/493* (2013.01); *H02P 25/027* (2013.01)

(58) Field of Classification Search
CPC ......... G01M 7/00; G01M 7/04; G01M 7/022; G01M 7/025; G01M 7/06; G01M 7/027; G01M 7/02
USPC .................................. 73/662, 663, 664, 668
See application file for complete search history.

(56) References Cited

U.S. PATENT DOCUMENTS

| | | | | |
|---|---|---|---|---|
| 3,569,847 A | * | 3/1971 | Adams | 330/255 |
| 3,579,132 A | * | 5/1971 | Ross | 330/251 |
| 3,777,557 A | * | 12/1973 | Dunlap et al. | 73/772 |
| 3,813,560 A | * | 5/1974 | Grant et al. | 327/379 |
| 3,859,557 A | * | 1/1975 | Grant et al. | 315/387 |
| 3,953,788 A | | 4/1976 | Taddeo et al. | |
| 4,067,057 A | | 1/1978 | Taddeo et al. | |
| 4,162,455 A | * | 7/1979 | Birt | 330/10 |
| 4,700,148 A | | 10/1987 | Pauly | |
| 5,644,175 A | * | 7/1997 | Galm | 307/131 |
| 5,963,086 A | * | 10/1999 | Hall | 330/10 |
| 6,157,272 A | * | 12/2000 | Kuo et al. | 333/100 |
| 6,331,765 B1 | * | 12/2001 | Yamamoto et al. | 323/210 |
| 7,848,369 B1 | * | 12/2010 | Bostak et al. | 372/26 |
| 2002/0033721 A1 | * | 3/2002 | Tachimori | 327/158 |
| 2004/0145357 A1 | * | 7/2004 | Lynch et al. | 323/208 |

OTHER PUBLICATIONS

"Switching Amplifiers with IGBT technology", http://www.dynsolusa.com/amplifiers.htm, Dynamic Solutions LLC, printed Apr. 26, 2012, in one page.

* cited by examiner

*Primary Examiner* — Helen Kwok
(74) *Attorney, Agent, or Firm* — Knobbe, Martens, Olson & Bear LLP

(57) ABSTRACT

Various examples of systems for powering a linear motor with a multi-phase amplifier are described herein. In some embodiments, an apparatus includes a plurality of current sources for supplying power to an electronic device. The plurality of current sources are configured to supply a substantially constant direct current to a load, and each of the plurality of current sources is configured to supply a periodic alternating current that is out of phase relative to the periodic alternating current of one or more of the other current sources. A sum of the periodic alternating currents from the plurality of current sources is configured to provide the substantially constant direct current. Embodiments of the systems can be used in vibration testing equipment such as electro-dynamic shakers.

20 Claims, 10 Drawing Sheets

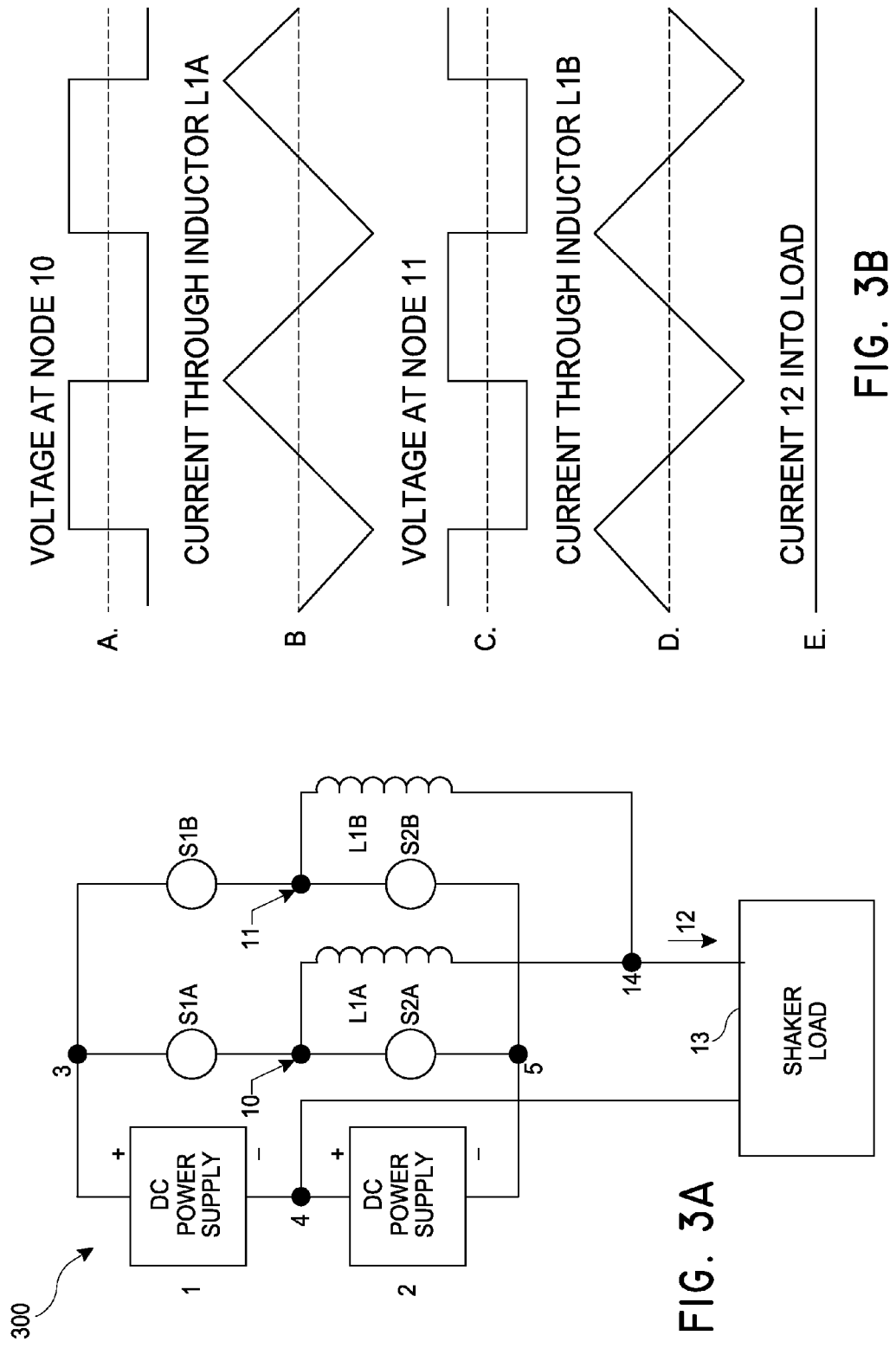

MULTI-PHASE POWER AMPLIFIER

CROSS REFERENCE TO RELATED APPLICATIONS

This application claims benefit under 35 U.S.C. §119(e) to U.S. Provisional Patent Application No. 61/638,359 entitled "MULTI-PHASE POWER AMPLIFIER" filed on Apr. 25, 2012; the disclosure of which is hereby incorporated by reference in its entirety.

FIELD

The present disclosure relates generally to amplifiers. More specifically, the disclosure is directed to multi-phase power amplifiers.

BACKGROUND

An electro-dynamic shaker is a type of linear motor used in vibration testing. Electro-dynamic shakers commonly require large currents to power the operation of the shakers. Linear amplifiers, including vacuum tubes or transistors, have been used to produce the large currents required. However, linear amplifiers can be expensive to purchase. Moreover, linear amplifiers can perform at a relatively low efficiency of approximately 30%, resulting in significant losses of power as heat during operation.

SUMMARY

In view of the foregoing and other challenges, improved amplifiers capable of providing large currents while reducing or minimizing manufacturing and operating costs are desired. Various implementations of systems, methods and devices are provided within the scope of the disclosure and the appended claims, with each having several aspects, no single one of which is solely responsible for the desirable attributes described herein. Without limiting the scope of the disclosure or the appended claims, some prominent features are described herein.

One aspect of this disclosure provides an apparatus for supplying power to an electronic device. The apparatus includes a plurality of current sources. Each of the plurality of current sources is configured to supply a periodic alternating current that is out of phase relative to the periodic alternating current of one or more of the other current sources of the plurality of current sources. The current sources are together configured to supply an output current that is a substantially constant direct current.

Another aspect of the disclosure provides an amplifier comprising N half-bridge switches that are pulse-width modulated and delayed from one another by $$\frac{360°}{N}.$$

The outputs of the N half-bridge switches are summed together through inductors.

In some implementations, large amounts of power can be switched with a low or minimal number of large power devices. In some such implementations, the large power devices may switch too slowly to achieve a desired performance for certain vibration testing applications. Accordingly, another aspect of the disclosure provides systems that can achieve the desired performance while switching at a low frequency. For some such systems, the desired performance can be described as the capability to produce a rated power with a high purity of waveform.

Embodiments of any of the disclosed systems can be used in powering vibration testing equipment such as electro-dynamic shakers, shock and vibration test equipment, transportation simulators, and/or charging one or more batteries, and the like. Embodiments of the systems can also be used in solar inverter applications and frequency changer applications.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Further no single feature or group of features is necessary or indispensable to each embodiment.

FIG. 3A is a circuit schematic of another example multi-phase amplifier and load system.

FIG. 3B is plots of example voltages and currents in a multi-phase amplifier and load system, such as the multi-phase amplifier and load system of FIG. 3A.

DETAILED DESCRIPTION

Overview

Linear amplifiers can be used as shaker amplifiers. The amplifiers were originally vacuum tube types and were later replaced by transistorized designs. Linear amplifiers can perform well, but can be very expensive both to purchase and operate due to their low efficiency of typically 35%. For example, some designs take about 300 watts of power for every 100 watts of results and the remaining 200 watts is dissipated as heat. Such designs may utilize thousands of transistors and water-cooling to remove the heat.

Figure 1:
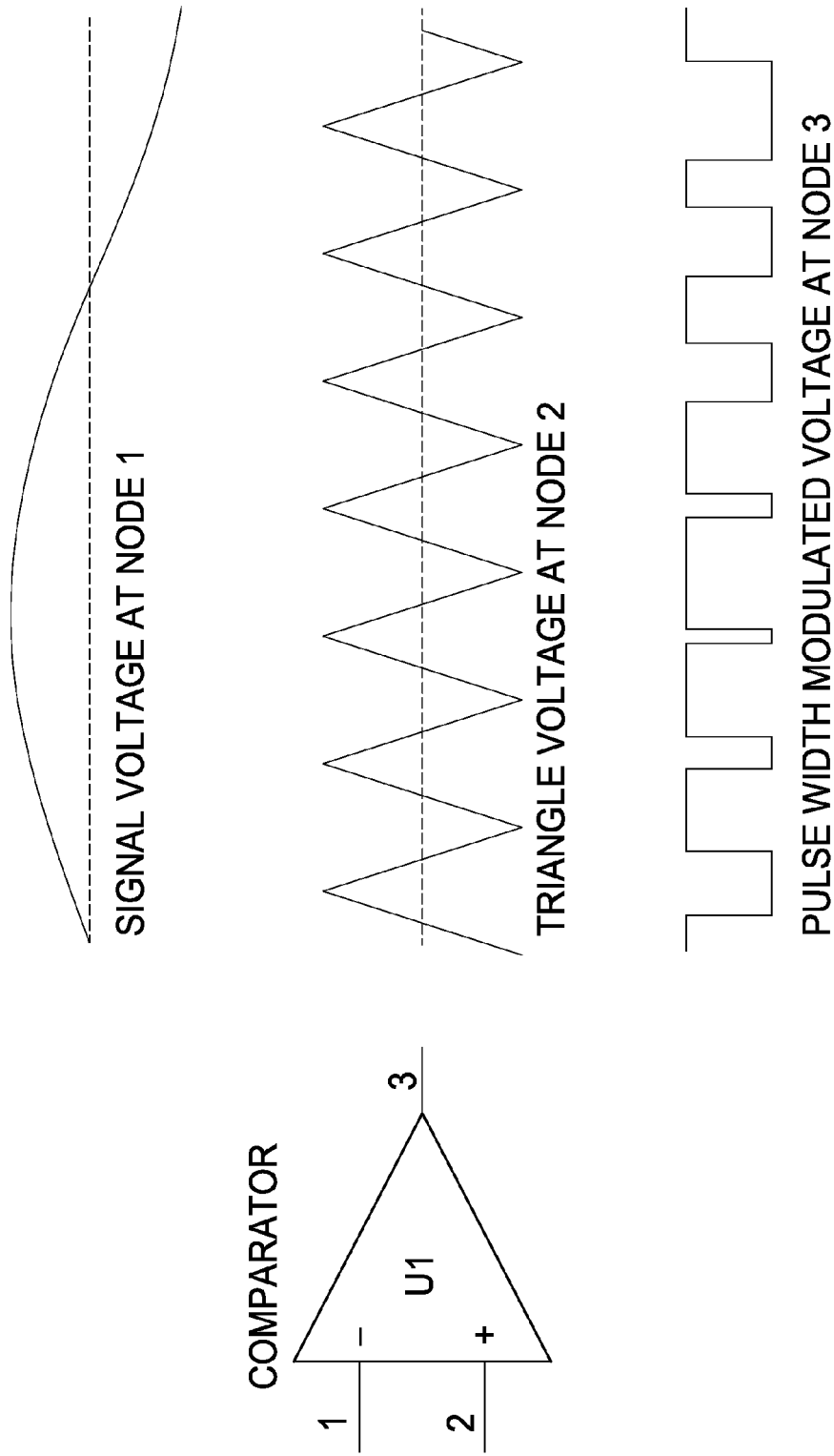
FIG. 1 illustrates operation of an example comparator.

Pulse-width modulated switching designs can be used as shaker amplifiers. Such amplifiers can perform nearly as well as the linear designs and may be about 85% efficient. For example, in some designs for every 100 watts of power provided only 15 watts of heat is lost, and air cooling can be practical. In some switching designs, a direct current (DC) voltage is switched at a high-frequency, and the switched waveform is pulse width modulated by the desired input waveform. The resulting waveform can be filtered to extract the fundamental output waveform. Switching frequencies of 50 to 1000 kHz can be employed. Full-bridge designs can be utilized to achieve the desired output voltage with FET devices that have low voltage ratings. FIG. 1 illustrates operation of an example comparator that can be used to perform pulse-width modulation. Plots of input voltage signals at node 1 and node 2 are shown, as well as the pulse-width modulated output voltage at node 3. The example comparator can be used to perform pulse-width modulation or generate the pulse-width modulation signals described in this disclosure.

To achieve a purity of waveform that is desired for some implementations, it can be advantageous to switch at the highest practical frequency. Large power transistors, however, may be too slow to switch as quickly as desired. Thus, multiple smaller field-effect transistor (FET) devices can be used. In some such implementations, as many as 1000 FETs may be used in a single Ling DMA-48 240 KVA amplifier (available from Ling Electronics, Anaheim, Calif.), compared to, for example, 6000 transistors in a comparable Ling 8000 linear design. The use of so many transistors, however, may dramatically raise the manufacturing costs. Accordingly, embodiments of improved amplifiers capable of providing large currents while reducing manufacturing and operating costs are described herein. Some such embodiments can also provide low signal distortion.

The amplifiers disclosed herein permit the use of transistors with relatively low switching frequencies and high power ratings. For example, switching transistors such as insulated gate bipolar transistors (IGBTs) can be used rather than or in addition to FETs. As a result, amplifier power output levels in excess of 20 kW, 70 kW, or 120 kW can be supplied at approximately 120 V with load currents in excess of 150 A or 1000 A. In addition, relatively fewer transistors can be used than may be used in some other designs, advantageously reducing manufacturing and operating costs. Some amplifiers described herein advantageously can use slower, larger IGBT transistors to achieve similar performance as smaller, faster FET type devices, with reduced manufacturing cost.

The amplifiers disclosed herein furthermore can advantageously generate output current waveforms that may not require output filters. The output current waveform can be generated in such a way that ripples in the output current may cancel and be reduced. Moreover, the generated output current waveforms can be substantially constant direct currents without utilizing output filters.

Multi-Phase Amplifiers

Figure 2B:
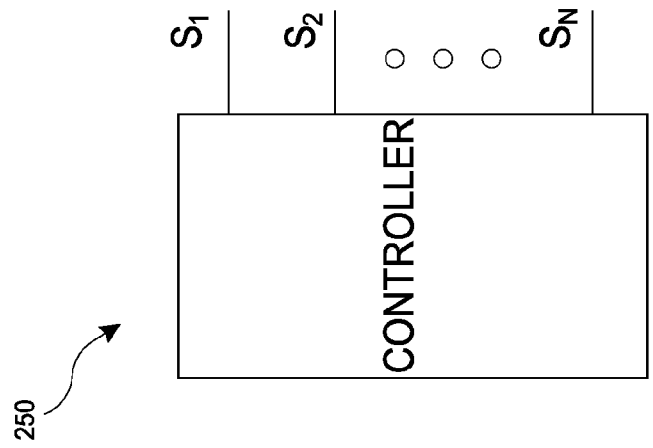
FIG. 2B is a block diagram of an example controller for a multi-phase amplifier.
Figure 2A:
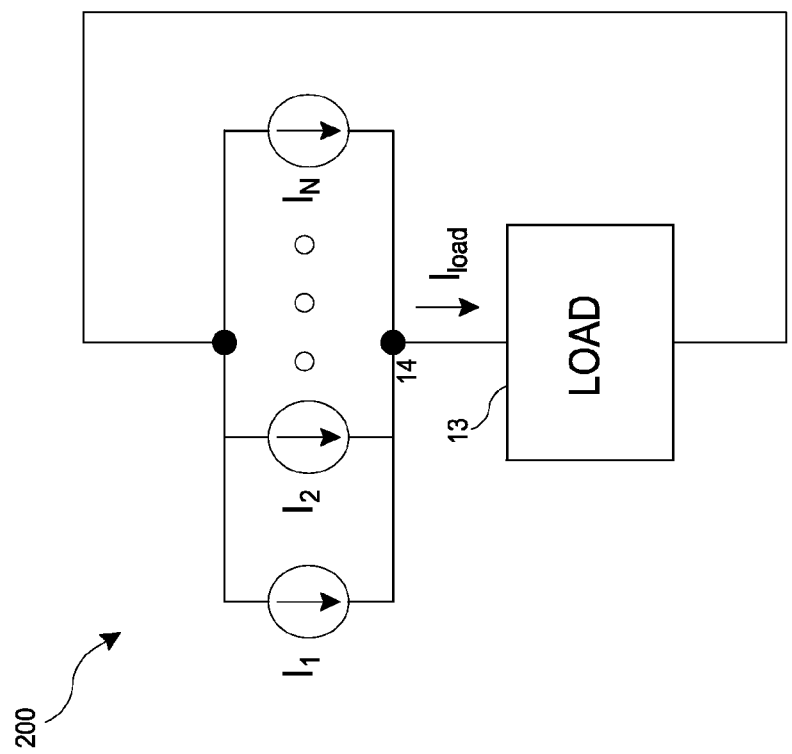
FIG. 2A is a circuit schematic of an example multi-phase amplifier and load system.

FIG. 2A is a circuit schematic of an example multi-phase amplifier and load system 200. The system 200 includes N current sources $I_1, I_2, \ldots, I_N$ and a load 13. The N current sources are electrically connected to the load 13 and supply a load current $I_{load}$ to the load 13. According to Kirchhoff's current law, the sum of the currents flowing into node 14 equals the currents flowing out of node 14. Kirchhoff's current law, in this case, can be described as follows in Equation 1.

$$I_{load} = I_1 + I_2 + \ldots + I_N \quad \text{(Equation 1)}$$

In some embodiments, each "current source" is a circuit component or set of components that supplies a current waveform (e.g., a "waveform" can be a mathematical description of a current over time). Further, the current waveforms can be configured such that current sources only supply current as opposed to sinking current from a circuit.

The current sources $I_1, I_2, \ldots, I_N$ can each output alternating, variable, pulsating, or direct current waveforms. Each of the current sources $I_1, I_2, \ldots, I_N$ can supply different current waveforms relative to the other current sources. Advantageously, in some embodiments, the output current waveforms from each of the current sources $I_1, I_2, \ldots, I_N$ can sum to a substantially constant direct current waveform and, accordingly, provide a substantially constant direct current $I_{load}$ to the load 13. For example, $I_{load}$ can be a unidirectional current that varies by ±1%, ±5%, or ±10% from an average current $I_{load}$ at steady-state operation of the system 200.

The current sources $I_1, I_2, \ldots, I_N$ can include various types of current sources. For example, the current sources can include one or more switched-mode power supplies or class-D amplifiers, such as half-bridge circuits.

The load 13 can include various loads that are powered by an alternating or direct current. For instance, the load 13 can include a linear motor, such as an electro-dynamic shaker for use with vibration testing equipment. The load 13 can be a motor or other electrical load in any type of apparatus for vibration testing.

FIG. 2B is a block diagram of an example controller 250 for a multi-phase amplifier, such as the multi-phase amplifier of FIG. 2A. The controller 250 can be configured to output N signals $S_1, S_2, \ldots, S_N$ to control the output currents of N current sources. For instance, the controller 250 can be configured to provide variable duty cycle signals to the gates of transistors in the current sources $I_1, I_2, \ldots, I_N$ of FIG. 2A. In some embodiments, the controller 250 provides 50% duty cycle square wave output signals $S_1, S_2, \ldots, S_N$, where each output signal is delayed or out of phase by a particular amount relative to the other signals. In some embodiments, the controller 250 can output greater or fewer than N signals, for instance, as a number of active current sources in the amplifier increases or decreases or depending on the control signals used to control the current sources and the design of the current sources.

FIG. 3A is a circuit schematic of another example multi-phase amplifier and load system 300. FIG. 3A illustrates one embodiment of the multi-phase amplifier and load system 200 of FIG. 2A. As illustrated, the system 300 includes two current sources and a shaker load 13 electrically connected at node 4 and node 14. Each current source in the illustrated embodiment includes a half-bridge circuit and an output inductor. The current sources include DC power supplies 1, 2 and inductors L1A, L1B electrically connected between two sets of two switches at node 10 and node 11. The DC power supplies 1, 2 are connected at node 4 to each other and in combination to switches S1A, S1B at node 3 and switches S2A, S2B at node 5. The DC power supplies 1, 2 can each include a battery and/or AC-to-DC conversion circuits to convert mains power to substantially constant DC voltage and power. The DC power supplies 1, 2 and switches S1A, S2A together form a first half-bridge circuit with an output at node 10, and the DC power supplies 1, 2 and switches S1B, S2B together form a second half-bridge circuit with an output at node 11. In some embodiments, switches S1A, S1B, 52A, S2B include one or more insulated gate bipolar transistors (IGBTs) or other bipolar junction transistors (BJTs), for example.

During operation of the system 300, switches S1A and S2A can be configured to open and close alternately under the control of a controller, such as the controller 250 of FIG. 2B. The controller can control the switches, for example, based on a periodic or non-periodic pulse-width modulated driving signal provided to switches S1A and S2A. As a result, a pulsating or square wave voltage waveform can be generated at node 10. In some embodiments, the controller supplies a pulse-width modulated driving signal having a 50% duty cycle, causing the generated voltage waveform at node 10 to be a periodic square wave voltage waveform as illustrated versus time in plot A of FIG. 3B. Inductor L1A, which is connected to node 10, senses the change in voltage at node 10 and conducts current. The current in inductor L1A can be determined as a function of time using Equation 2 below.

$$I = \frac{1}{L}\int V dt \qquad \text{(Equation 2)}$$

where I is the current through the inductor, L is the inductance of the inductor, V is the voltage across the inductor, and the integration is performed with respect to time. If inductor L1A is not permitted to enter saturation (e.g., saturation can be a zone of operation where an inductor behaves non-linearly), the current through inductor L1A is a triangle wave current waveform as illustrated versus time in plot B of FIG. 3B.

Similarly, switches S1B and S2B can be configured to open and close alternately during operation of the system 300, generating a pulsating or square wave voltage waveform at node 11. An example generated square wave voltage waveform at node 11 is illustrated versus time in plot C of FIG. 3B. Inductor L1B, which is connected to node 11, senses the change in voltage at node 11 and conducts a current having a triangle wave current waveform as long as the inductor L1B is not permitted to enter saturation. An example triangle wave current waveform through inductor L1B is illustrated versus time in plot D of FIG. 3B.

In the illustrated embodiment of FIGS. 3A and 3B, the switches S1A and S1B are configured to open and close alternately under the control of the controller. As a result, the square wave voltage waveform at node 10 and node 11 are the same or common waveforms and out of phase relative to each other. The square wave voltage waveform at node 10 in this implementation is 180° out of phase relative to the square wave voltage waveform at node 11. If inductor L1A and inductor L1B have the same inductance, the triangle wave current waveforms through inductor L1A and inductor L1B are further the same waveforms but 180° out of phase relative to each other. Thus, according to Kirchhoff's current law at node 14, the load current 12 into the shaker load 13 can be a constant direct current as illustrated versus time in plot E of FIG. 3B. In actual implementation, the components and waveforms may not be identically the same, and the relative phase difference may not be precisely 180°. Accordingly, the system 300 can be designed so that the load current 12 is a substantially constant direct current waveform, such as a unidirectional current that varies by ±1%, ±5%, or ±10% from an average current at steady-state operation of the system 300.

Figure 4:
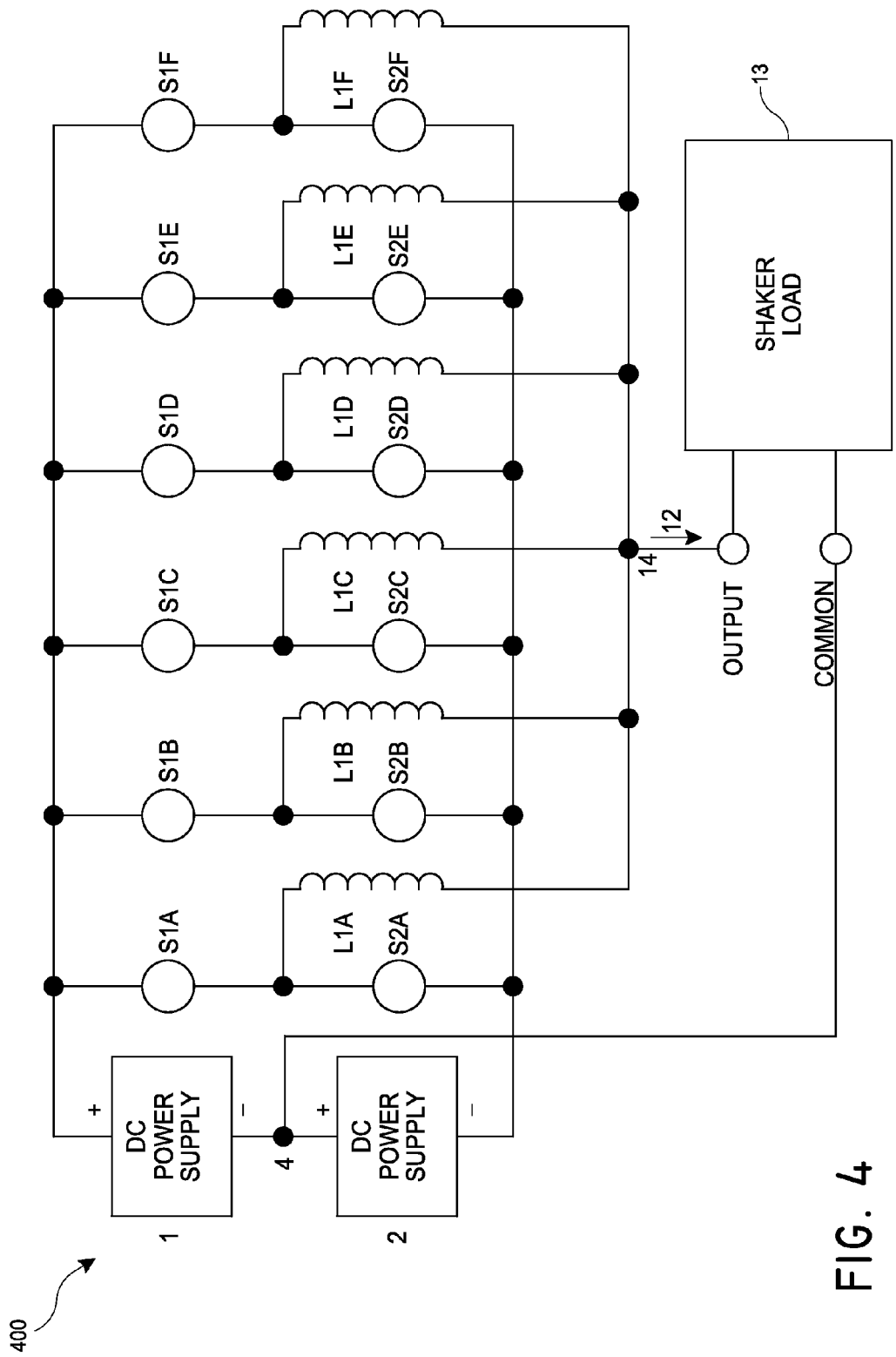
FIG. 4 is a circuit schematic of yet another example multi-phase amplifier and load system.
Figure 5A:
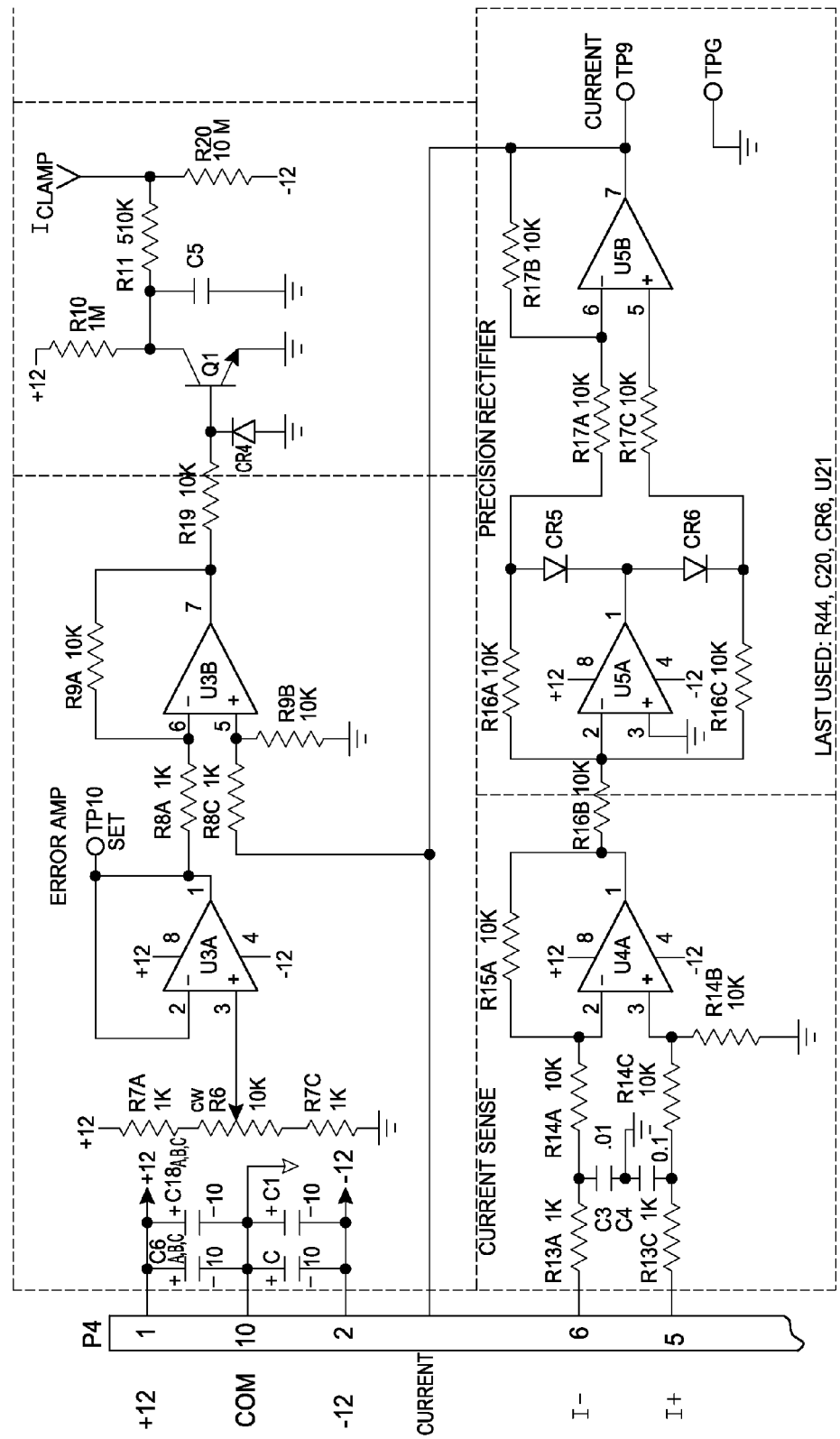
FIGS. 5A-5D are circuit schematics of an example multi-phase modulator.
Figure 5B:
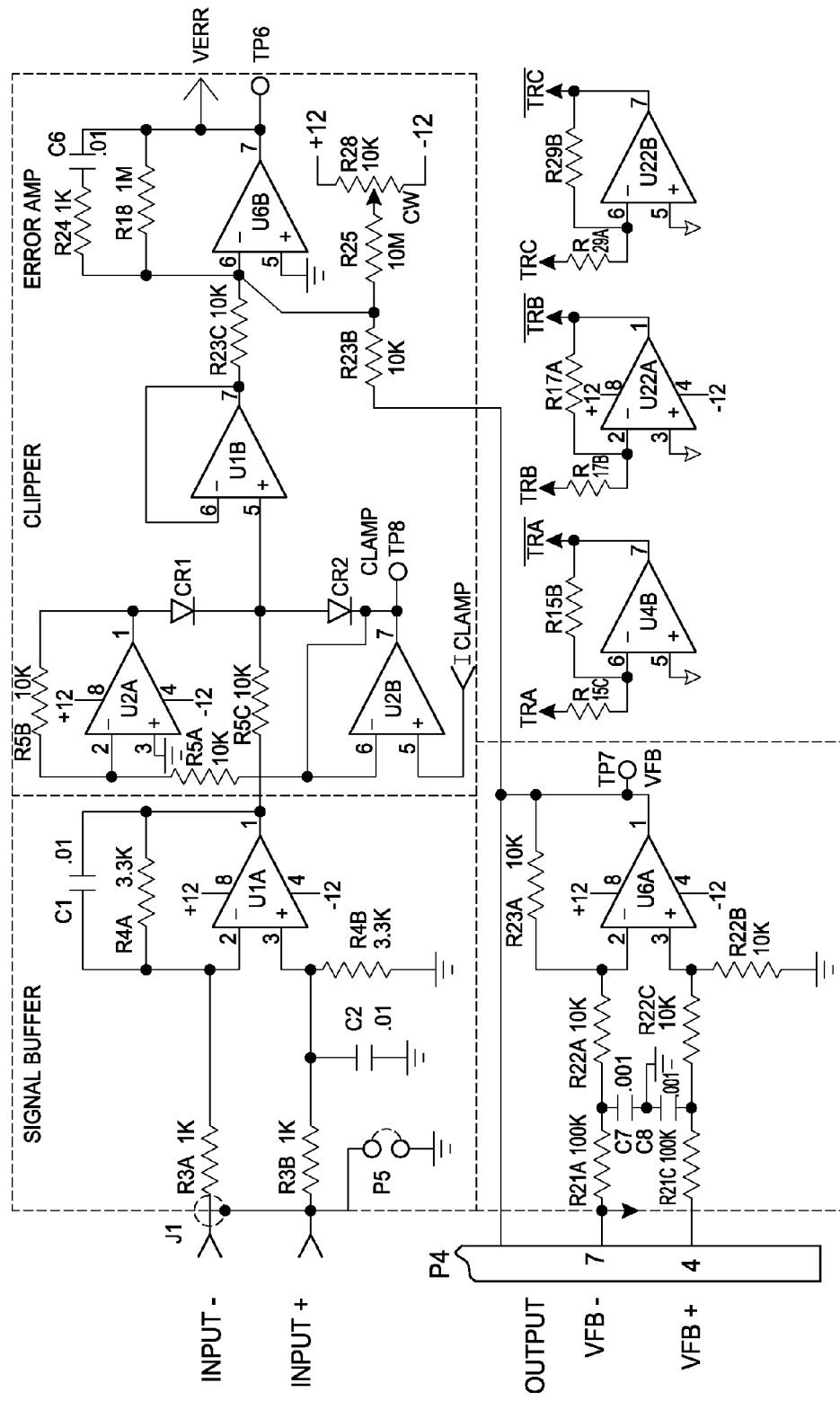
Figure 5C:
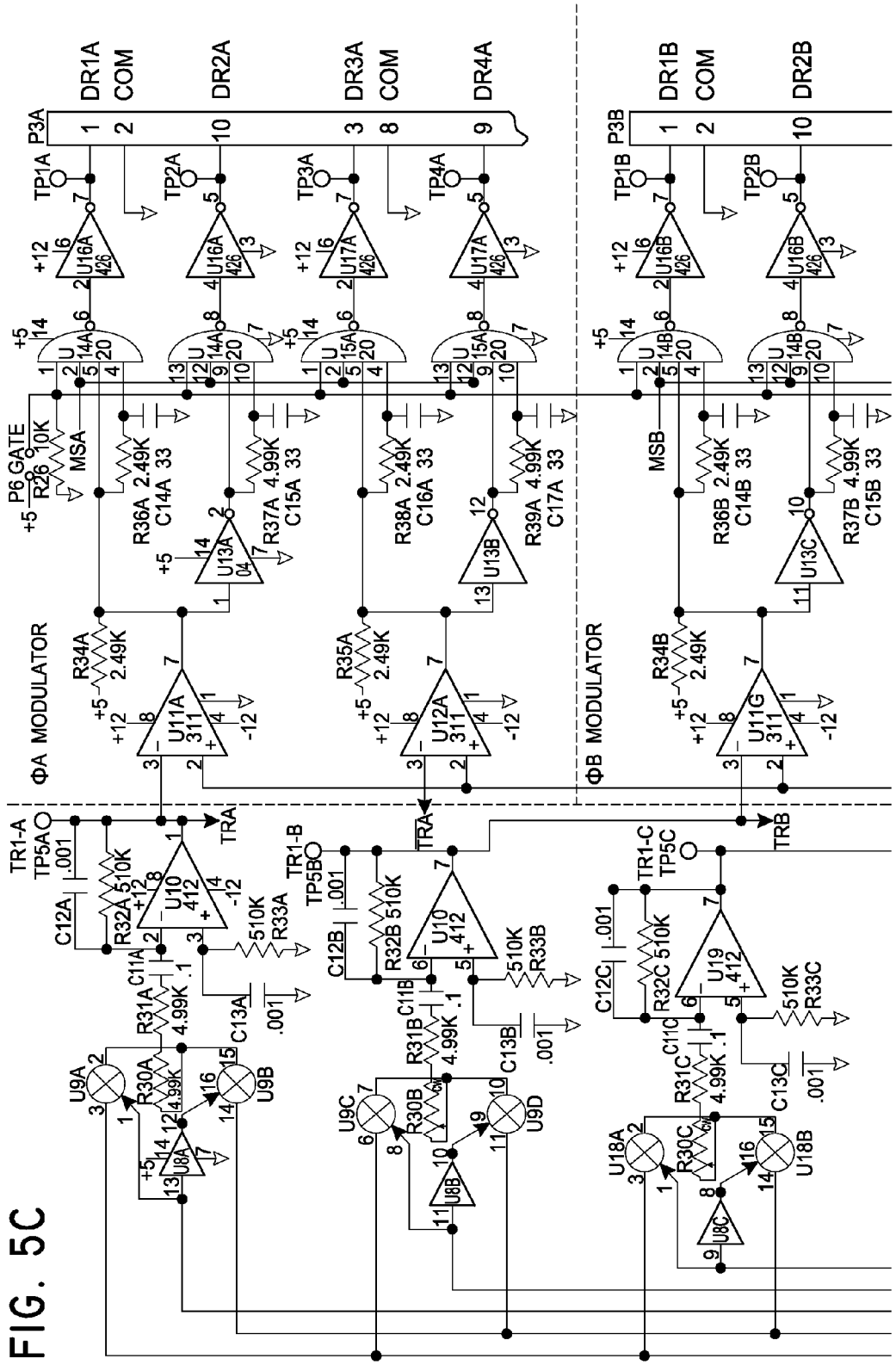
Figure 5D:
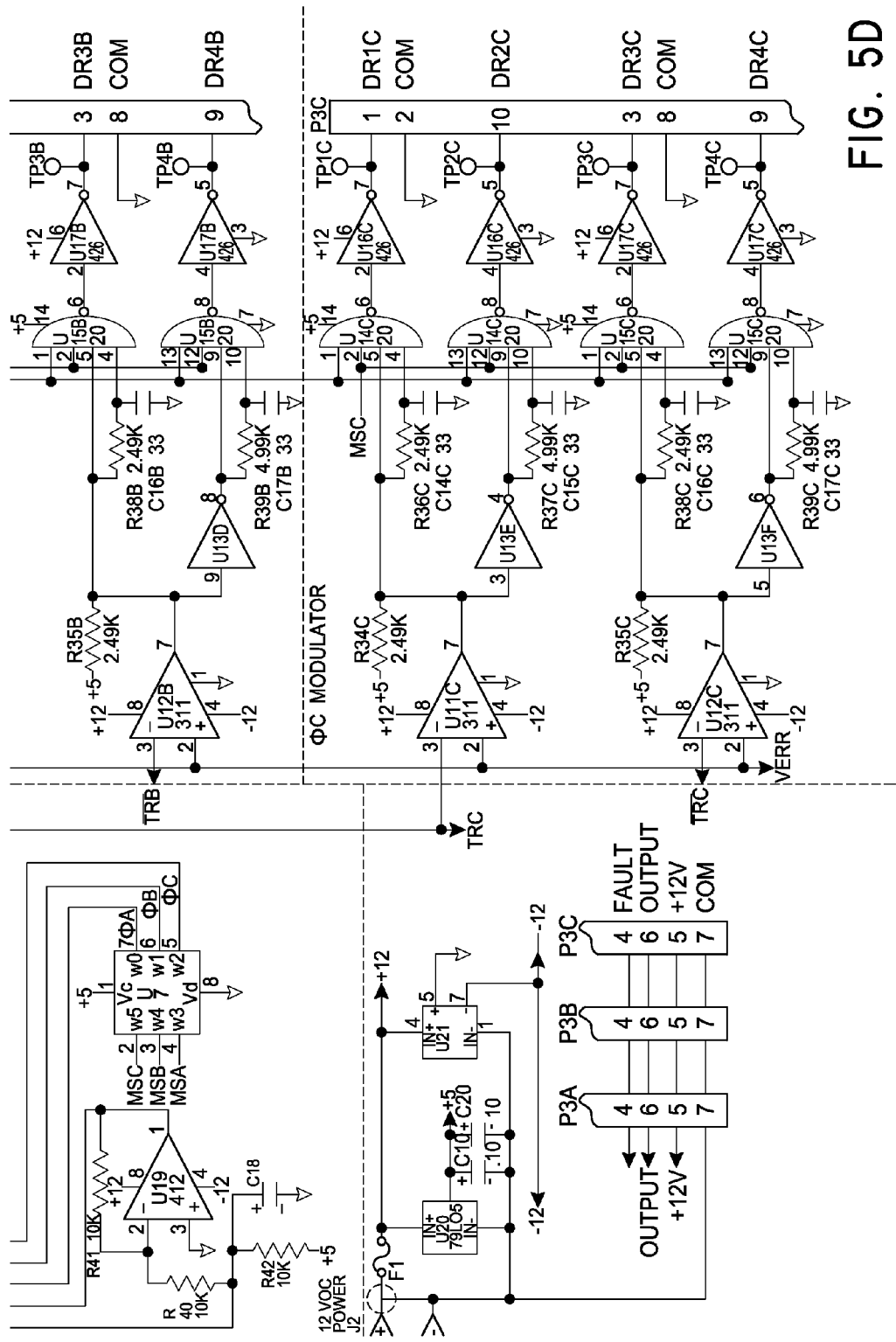

FIG. 4 is a circuit schematic of yet another example multi-phase amplifier and load system 400. FIG. 4 illustrates one embodiment of the multi-phase amplifier and load system 200 of FIG. 2A. As illustrated, the system 400 includes six current sources and a shaker load 13 electrically connected at node 4 and node 14. The current sources in the illustrated embodiment are six half-bridge circuits with output inductors, including two DC power supplies 1, 2 electrically connected to components described in Table 1 that follows. In some embodiments, switches in Table 1 include one or more IGBTs or other BJTs.

TABLE 1

| Current Source No. | Switches | Inductor |
|---|---|---|
| 1 | S1A, S2A | L1A |
| 2 | S1B, S2B | L1B |
| 3 | S1C, S2C | L1C |
| 4 | S1D, S2D | L1D |
| 5 | S1E, S2E | L1E |
| 6 | S1F, S2F | L1F |

During operation of the system 400, switches S1A and S2A can be configured to open and close alternately under the control of a controller, such as the controller 250 of FIG. 2B. The controller can control switches S1A and S2A, for example, based on a periodic or non-periodic pulse-width modulated driving signal provided to switches S1A and S2A. As a result, a pulsating or square wave voltage waveform can be generated at the node connecting switches S1A, S2A and inductor L1A. When a periodic square wave voltage waveform is generated, inductor L1A senses the change in voltage at the node and conducts a current having a triangle wave current waveform provided that inductor L1A is not permitted to enter saturation.

The switches and inductors of each of the current sources 2-6 can be configured to operate similarly to switches S1A, S2A and inductor L1A of current source 1. The switches of current sources 2-6 can thereby generate a periodic square wave voltage waveform at the node connecting each respective set of switches and inductor. The inductors can sense the change in voltage at the connecting nodes and conduct a current having a triangle wave current waveform.

In some embodiments, the switches of each half-bridge circuits generate a common output square wave voltage waveform but out of phase relative to the other half-bridge circuits. The common output square wave voltage waveforms can be generated by each half-bridge circuit, for instance, by providing pulse-width modulated driving signals having the same duty cycle (e.g., a 50% duty cycle) with delayed timings. If the inductors L1A, L2A, L3A, L4A, L5A, L6A have the same inductance, the output triangle wave current waveforms through each inductor can also be a common current waveform but out of phase relative to the common current waveforms through the other inductors. Moreover, the phase difference or minimum phase difference between each of the voltage and current waveforms can be designed or selected so that the load current 12 (i.e., the sum of the currents supplied by the six current sources) is a constant direct current. In the illustrated six half-bridge example implementation, a minimum phase difference of 60° can be chosen. For example, current source 1 can have a starting phase of 0°, current source 2 can have a starting phase of 60°, current source 3 can have a starting phase of 120°, current source 4 can have a starting phase of 180°, etc. In actual implementation, the components and waveforms may not be identically the same, and the relative phase differences may not be precisely 60° (e.g., the relative phase differences may be 60°±1° or 60°±5° due to timing delays or design constraints, for instance). Accordingly, the system 400 can be designed so that the load current 12 is a substantially constant direct current, such as a unidirectional current that varies by ±1%, ±5%, or ±10% from an average current at steady-state operation of the system 400.

Further, as illustrated by the six half-bridge circuit example implementation, a multi-phase amplifier employing the 60° minimum phase difference advantageously results in cancelation of ripple currents or alternating currents that may otherwise appear in the load current 12. Each inductor current waveform may have one complementary inductor current waveform that is 180° out of phase relative to the inductor current waveform. The sum of the inductor current waveform and the complementary inductor current waveform can be a constant direct current. When the implementation includes non-ideal components and waveforms and system interferences, the sum of the two complementary waveforms may not be precisely a direct current and may instead be a substantially constant direct current waveform (e.g., a current that varies by ±1%, ±5%, or ±10% from an average current at steady-state operation). For instance, current source 1 is 180° out of phase relative to current source 4 in the example implementation so that the sum of the currents through inductors L1A and L1D is a direct current. As a result, the multi-phase amplifier may advantageously not include an output filter, such as a low-pass output filter to remove high frequency components of the load current 12 or high frequency generated electromagnetic interference.

Cancelation of ripple currents in the load current 12 can advantageously extend, based on the same principles, to other amplifier designs that include an even number of current sources. In some embodiments, other types of ripple current cancelation can be advantageously realized using similar multi-phase amplifier designs with an odd number of current sources.

In some embodiments, greater or fewer than six current sources (e.g., 2, 3, 4, 5, 7, or 8 current sources, etc.) can be configured to generate a common triangle wave current waveform but out of phase relative to the other current sources. For those cases, a general expression for a minimum phase difference between the common triangle wave current waveforms of current sources can be given by Equation 3 below.

$$\text{Minimum Phase Difference} = \frac{360°}{N} \quad \text{(Equation 3)}$$

where N is the number of current sources for the system. Further, the general expression for the load current in those cases can be given by Equation 4 below.

$$I_{load} = \frac{I_{1max} \cdot N}{2} \quad \text{(Equation 4)}$$

where $I_{load}$ is the load current, $I_{1max}$ is maximum current provided by one current source, and N is the number of current sources for the system. Additionally, the performance of a plurality of current sources operating out of phase can be characterized relative to the performance of one large current source, using Equation 5.

$$f_A = f_1 \cdot N \quad \text{(Equation 5)}$$

where $f_A$ is the operating frequency of the one large current source, $f_1$ is the operating frequency of one current source having multiple current sources, and N is the total number of multiple current sources. For example, the performance of ten half-bridge current sources switching at 10 kHz can be equivalent to one large half-bridge current source switching at 100 kHz.

FIGS. 5A-5D are circuit schematics of an example multi-phase modulator. The multi-phase modulator of FIGS. 5A-5D can be used to implement one or more of the multi-phase amplifier and load systems as discussed in this disclosure.

Figure 6:
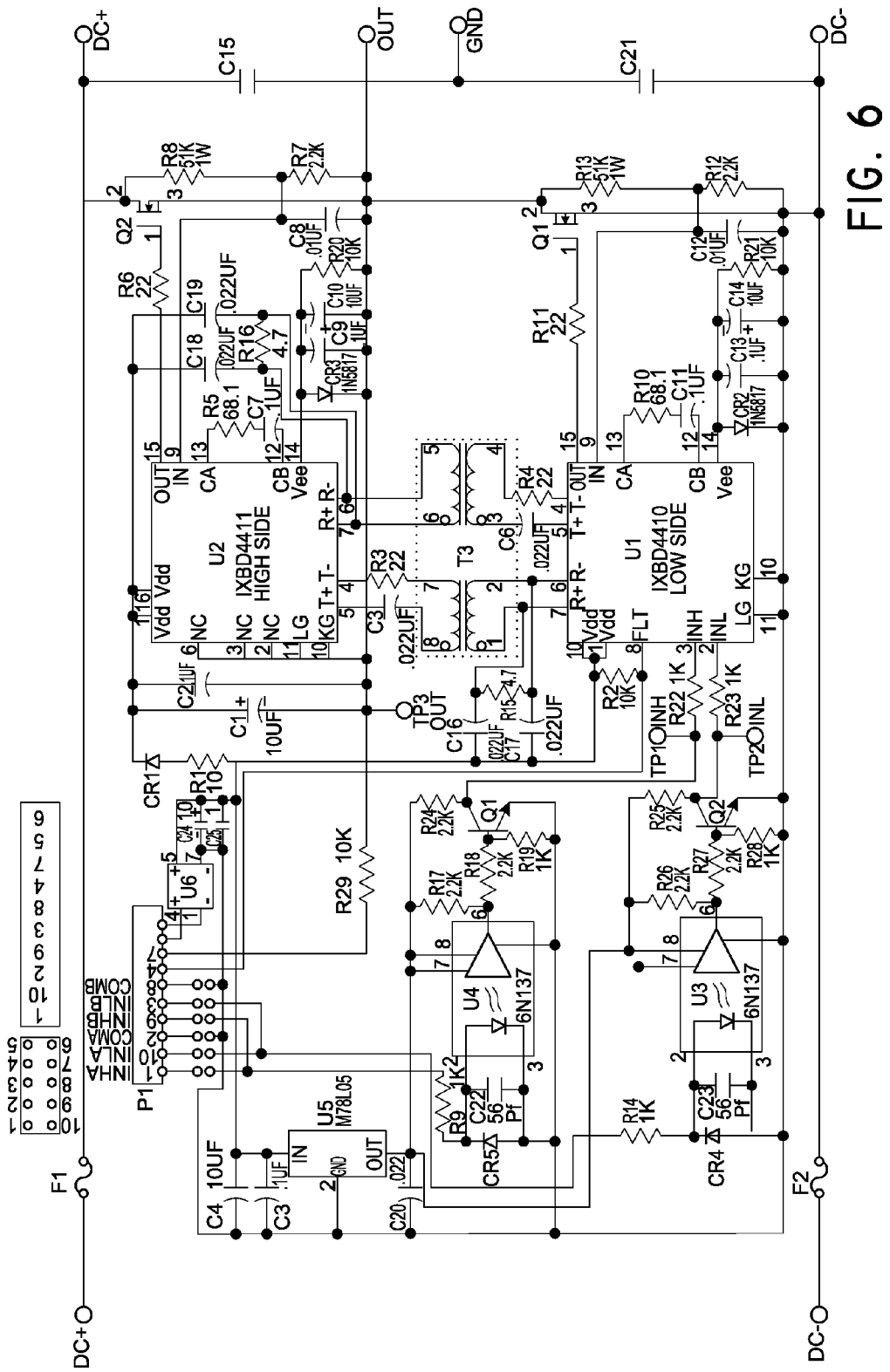
FIG. 6 is a circuit schematic of an example half-bridge switch.

FIG. 6 is a circuit schematic of an example half-bridge switch. The half-bridge switch of FIG. 6 can be used to design one or more of the half-bridge circuits described in this disclosure.

In one example implementation, an amplifier is powered at 120 V (avg/rms) and 167 Amps (avg/rms) to perform at a power of approximately 20 kVA or 20 kW. The output of the amplifier is in a frequency range from approximately 20 Hz to 3 kHz. The amplifier can provide less than 1% (e.g., 0.5%) total harmonic distortion (THD) over the frequency range when operated at full power. The amplifier can be air-cooled, e.g., using 120 mm fans. The amplifier may be mounted in a cabinet with operational displays (e.g., light emitting diode (LED) displays) to show amplifier operating conditions including, e.g., system ready, off-line, enabled, over-drive (e.g., on at 90% rated voltage), interlock indications (e.g., shaker over-travel and over-temperature), amplifier over-current or over-voltage, input phase loss, control power, rectifier over-temperature, faults, etc.

Figure 7:
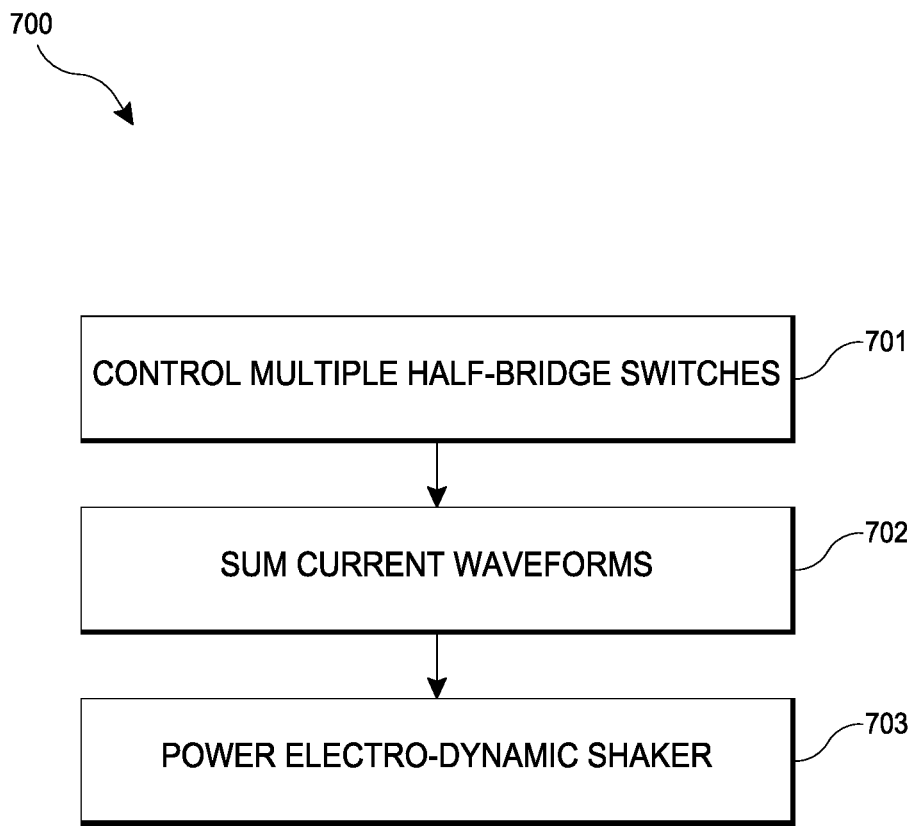
FIG. 7 is a flowchart of an example method for generating an electrical current to power operation of a device.

Various methods can be used for powering equipment used in vibration testing. These various methods can be performed by the circuitry shown and described with references to the figures. For example, in method 700 of FIG. 7, at block 701, a plurality of half-bridge switches are controlled using pulse-width modulated signals so that each half-bridge switch generates a periodic alternating current waveform in at least one inductor that is out of phase relative to the periodic alternating current waveform generated in at least one other inductor by another half bridge switch of the plurality of half-bridge switches. At block 702, the periodic alternating current waveforms of the plurality of half bridge switches are summed to output a substantially constant direct current. At block 703, the substantially constant direct current is supplied to an electro-dynamic shaker to power operation of the electro dynamic shaker.

In some implementations, the method can further include controlling each of the plurality of half-bridge switches to generate a common periodic alternating current waveform that is out of phase with respect to the common periodic alternating current waveform of the at least one other half-bridge switch. The method can also include controlling the plurality of half-bridge switches so that the common periodic alternating current waveform of each half-bridge switch is out of phase by at least about $$\frac{360°}{N}$$

relative to the common periodic alternating current waveforms of the other half-bridge switches of the plurality of half-bridge switches, wherein N equals a total number of half-bridge switches of the plurality of half-bridge switches. In some cases, the substantially constant direct current is configured to vary by less than about ±1% from an average current.

Any of the foregoing methods may be applied to apparatus for vibration testing. For example, the method can include supplying the substantially constant direct current to an electro-dynamic shaker to power operation of the electro-dynamic shaker.

Although examples in this disclosure may be discussed regarding applications for motors, such as supplying power to electro-dynamic shakers, the amplifiers disclosed herein can also be used, for example, as power converters for solar inverter applications or as frequency converters.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, elements and components can be configured or arranged differently, combined, and/or eliminated in various embodiments. The various features and processes described above may be used independently of one another, or may be combined in various ways. All possible combinations and subcombinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

What is claimed is:

1. An apparatus for vibration testing, comprising:
    a plurality of current sources configured to output a substantially constant direct current, each current source of the plurality of current sources comprising a half-bridge switch configured to operate based on a pulse-width modulated signal and an inductor electrically connected to an output of the half-bridge switch, each current source of the plurality of current sources configured to individually supply a periodic alternating current waveform that is out of phase relative to the periodic alternating current waveforms of the other current sources of the plurality of current sources, a sum of the periodic alternating current waveforms from the plurality of current sources providing the substantially constant direct current; and
    an electro-dynamic shaker configured to electrically connect to the plurality of current sources and receive the substantially constant direct current to power operation of the electro-dynamic shaker,
    wherein the plurality of current sources comprise more than two current sources and an even number of total current sources.

2. The apparatus of claim 1, wherein the substantially constant direct current is configured to vary by less than ±5% from an average current.

3. An apparatus for supplying power to an electronic device, comprising a plurality of current sources configured to supply a substantially constant direct current to a load, each current source of the plurality of current sources configured to supply a periodic alternating current that is out of phase relative to the periodic alternating current of at least one other current source of the plurality of current sources, a sum of the periodic alternating currents supplied by the plurality of current sources providing the substantially constant direct current.

4. The apparatus of claim 3, wherein each current source of the plurality of current sources comprises a class-D amplifier and an inductor electrically connected to an output of the class-D amplifier.

5. The apparatus of claim 3, wherein each current source of the plurality of current sources comprises a half-bridge switch configured to operate based on a pulse-width modulated signal and an inductor electrically connected to an output of the half-bridge switch.

6. The apparatus of claim 5, wherein each current source is configured to supply the periodic alternating current out of phase by at least about $$\frac{360°}{N}$$

relative to the periodic alternating current of the at least one other current source, wherein N equals a total number of current sources of the plurality of current sources.

7. The apparatus of claim 5, wherein each current source is configured to supply a common periodic alternating current waveform that is out of phase with respect to the common periodic alternating current waveform of at least one other current source of the plurality of current sources.

8. The apparatus of claim 5, wherein the plurality of current sources comprise an even number of total current sources.

9. The apparatus of claim 5, wherein the substantially constant direct current is configured to vary by less than about ±5% from an average current.

10. The apparatus of claim 5, wherein the load comprises a linear motor.

11. The apparatus of claim 5, wherein the load comprises an electro-dynamic shaker.

12. The apparatus of claim 5, wherein the load comprises a battery.

13. The apparatus of claim 5, further comprising means for generating the pulse-width modulated signal.

14. The apparatus of claim 13, wherein said means for generating the pulse-width modulated signal comprises a controller.

15. The apparatus of claim 3, wherein the substantially constant direct current is configured to vary by less than about ±5% from an average current.

16. A method for powering equipment used in vibration testing, the method comprising:
    controlling a plurality of half-bridge switches using pulse-width modulated signals so that each half-bridge switch generates a periodic alternating current waveform in at least one inductor that is out of phase relative to the periodic alternating current waveform generated in at least one other inductor by another half-bridge switch of the plurality of half-bridge switches; and
    summing the periodic alternating current waveforms of the plurality of half-bridge switches to output a substantially constant direct current.

17. The method of claim 16, further comprising supplying the substantially constant direct current to an electro-dynamic shaker to power operation of the electro-dynamic shaker.

18. The method of claim 17, further comprising controlling each of the plurality of half-bridge switches to generate a common periodic alternating current waveform that is out of phase with respect to the common periodic alternating current waveform of the another half-bridge switch.

19. The method of claim 18, further comprising controlling the plurality of half-bridge switches so that the common periodic alternating current waveform of each half-bridge switch is out of phase by at least about $$\frac{360°}{N}$$

relative to the common periodic alternating current waveform of each other half-bridge switch of the plurality of half-bridge switches, wherein N equals a total number of half-bridge switches of the plurality of half-bridge switches.

20. The method of claim 19, wherein the substantially constant direct current is configured to vary by less than about ±1% from an average current.

* * * * *